(12) United States Patent
Weisser et al.

(10) Patent No.: US 8,631,710 B2
(45) Date of Patent: Jan. 21, 2014

(54) SENSOR

(75) Inventors: Dietmar Weisser, Tuttlingen (DE);
Benjamin Schullcke, Radolfzell (DE);
Heinrich Müller, Tuttlingen (DE);
Markus Scheiter, Wurmlingen (DE)

(73) Assignee: Marquardt Mechatronik GmbH,
Rietheim-Weilheim (DE)

( * ) Notice: Subject to any disclaimer, the term of this patent is extended or adjusted under 35 U.S.C. 154(b) by 0 days.

(21) Appl. No.: 13/309,031

(22) Filed: Dec. 1, 2011

(65) Prior Publication Data

US 2012/0125116 A1  May 24, 2012

Related U.S. Application Data

(63) Continuation of application No. PCT/DE2010/000614, filed on Jun. 2, 2010.

(30) Foreign Application Priority Data

Jun. 3, 2009 (DE) .......................... 10 2009 023 734

(51) Int. Cl.
*G01L 9/10* (2006.01)
*G01L 3/00* (2006.01)
*G01L 9/12* (2006.01)

(52) U.S. Cl.
USPC .................................. 73/728; 73/723; 73/718

(58) Field of Classification Search
USPC ........................................ 73/717, 723, 728
See application file for complete search history.

(56) References Cited

U.S. PATENT DOCUMENTS

| 4,056,009 | A |   | 11/1977 | Sonderegger et al. |
| 4,351,191 | A |   | 9/1982 | Iwasaki |
| 5,025,667 | A |   | 6/1991 | Strasser |
| 5,140,733 | A | * | 8/1992 | Shimada et al. ............. 29/896.9 |
| 8,312,775 | B2 | * | 11/2012 | Motoyama ...................... 73/717 |
| 2005/0000291 | A1 |   | 1/2005 | Shirai et al. |
| 2010/0043563 | A1 | * | 2/2010 | Kageyama et al. ............ 73/722 |
| 2012/0198940 | A1 | * | 8/2012 | Yu et al. ......................... 73/723 |

FOREIGN PATENT DOCUMENTS

| DE | 31 33 057 | A1 |   | 6/1982 |
| DE | 93 06 961 | U1 |   | 7/1993 |
| DE | 689 08 697 | T2 |   | 12/1993 |
| DE | 690 15 704 | T2 |   | 5/1995 |
| DE | 4444167 | A1 | * | 7/1995 |
| DE | 197 45 858 | A1 |   | 4/1998 |
| DE | 19745858 | A1 | * | 4/1998 |
| DE | 103 29 159 | A1 |   | 1/2005 |
| DE | 44 44 167 | B4 |   | 3/2005 |
| DE | 10 2008 022 465 | A1 |   | 11/2008 |
| DE | 102008022465 | A1 | * | 11/2008 |

(Continued)

*Primary Examiner* — Lisa Caputo
*Assistant Examiner* — Jamel Williams
(74) *Attorney, Agent, or Firm* — Burr & Brown, PLLC

(57) ABSTRACT

The invention relates to a measuring apparatus for measuring a measurement variable of a fluid, in particular a sensor, such as a pressure sensor or a travel sensor. The measuring apparatus has a housing, a diaphragm which is arranged in and/or on the housing and an elastic element, which is designed in the manner of a leaf spring, for restoring the diaphragm. A signal transmitter is operatively connected to the diaphragm and/or to the elastic element, and a signal receiver interacts with the signal transmitter. Structures for providing reinforcement are arranged in the edge region and/or in the center of the elastic element.

10 Claims, 5 Drawing Sheets

(56) References Cited

FOREIGN PATENT DOCUMENTS

| DE | 10 2008 025 045 | A1 | | 12/2008 |
|---|---|---|---|---|
| DE | 102008025045 | A1 | * | 12/2008 |
| EP | 0 194 937 | A1 | | 9/1986 |
| FR | 2 290 612 | A1 | | 6/1976 |

* cited by examiner

SENSOR

CROSS REFERENCE TO RELATED APPLICATIONS

This application is a continuation of International Application No. PCT/DE2010/000614 filed Jun. 2, 2010, which designated the United States, and claims the benefit under 35 USC §119(a)-(d) of German Application No. 10 2009 023 734.8 filed Jun. 3, 2009, the entireties of which are incorporated herein by reference.

FIELD OF THE INVENTION

The invention relates to a measuring apparatus for measuring a measurement variable of a fluid, in particular sensor, such as a pressure sensor or a travel sensor.

BACKGROUND OF THE INVENTION

The measuring apparatus may be a sensor, such as a pressure sensor, a travel sensor or the like. Measuring apparatuses of this kind serve primarily for measuring a measurement variable of a fluid, for example for measuring a water level in washing machines, dishwashers, wet and/or dry vacuum devices or in other water-bearing parts of domestic appliances. These measuring apparatuses are, in particular, pressure sensors for low pressures, specifically of less than 3500 Pa (Pascals) for example.

Such measuring apparatuses having a housing and having a diaphragm which is arranged in and/or on the housing are known. An elastic element for restoring the diaphragm is located in the housing. A signal transmitter is operatively connected to the diaphragm and/or to the elastic element. A signal receiver interacts with the signal transmitter in order to generate the measurement signal. A certain hysteresis is observed in these sensors when the pressure and/or the temperature of the fluid to be measured changes, and this, in turn, can lead to corruption of the measurement signal.

SUMMARY OF THE INVENTION

The invention is based on the object of designing the measuring apparatus in such a way that the quality of the measurement signal is improved in respect of such changes in temperature and/or pressure. The intention is, in particular, to provide a spring/diaphragm system as a measuring apparatus for a small mechanical pressure sensor in the low-pressure range, said spring/diaphragm system requiring little installation space and exhibiting very low hysteresis in respect of the pressure and/or the temperature.

In the measuring apparatus according to the invention, the elastic element has a structure for providing reinforcement. In other words, structures are introduced into the geometry of the elastic element in certain regions for the purpose of reinforcing said elastic element. This creates a space-saving and low-hysteresis spring/diaphragm system of a pressure sensor which is primarily suitable for low pressures.

In order to reduce the installation space of the measuring apparatus, provision is made for the elastic element to be designed in the manner of a disk-like leaf spring. The leaf spring expediently has a circular shape which substantially corresponds to the shape of the diaphragm. A particularly high restoring force can be achieved in the elastic element by the leaf spring having a spring element which runs from the center to the edge region of the leaf spring in the manner of a spiral. This ensures a compact design with a high spring force.

For the sake of simplicity, provision can be made for the structures for providing reinforcement to be arranged in the edge region and/or in the center of the elastic element. In other words, in the case of the leaf spring, structures for providing reinforcement are then introduced in the edge region and/or in the center. The structure for providing reinforcement can be designed as a bead in a simple manner. The bead can, once again for the sake of simple producibility, have an approximately U-shaped cross section. In a cost-effective manner, the elastic element can be produced as a stamped metal part, it being possible to impress the structure into the elastic element.

In a simple and cost-effective refinement, the signal transmitter consists of a magnet. The signal receiver consists of a position sensor which detects the magnetic field which is generated by the magnet. The position sensor can be a Hall sensor. Provision is made for the signal transmitter to be arranged on the elastic element, specifically in particular in the center of said elastic element, in the structure. In this case, the structure simultaneously serves as a receptacle for the signal transmitter. In order to prevent shifting between the magnet and the spring, the signal transmitter is expediently adhesively bonded to the elastic element.

In order to largely protect the sensitive parts of the measuring apparatus against harmful influences, the diaphragm and the elastic element and also the signal transmitter and the signal receiver can be arranged in the interior of the housing. The housing then has a connection nozzle for supplying the fluid which is to be measured to the diaphragm.

The advantages achieved by the invention are, in particular, that the spring/diaphragm system has a low pressure hysteresis on account of the reinforcements. Owing to the temperature-dependent friction between the diaphragm, which is composed of silicone for example, and the metal of the spring, conventional, unreinforced spring bowls in the edge region. In contrast, the spring/diaphragm system according to the invention has a low temperature hysteresis. Furthermore, the spring is mechanically stiff in the edge region and is therefore easier to handle in terms of manufacturing during production of the sensor. The reinforced edge region moreover counteracts a distortion in the edge region of the spring, for example if the sensor falls down, as a result of which the corruption of the behavior of the sensor which otherwise occurs in this case is counteracted. Finally, the overall height of the spring/diaphragm system according to the invention is also extremely low, as a result of which the sensor is particularly suitable for cramped installation areas.

BRIEF DESCRIPTION OF THE DRAWINGS

Exemplary embodiments of the invention together with various developments and refinements will be described in greater detail below and are illustrated in the drawings.

DETAILED DESCRIPTION OF THE INVENTION

Figure 1:
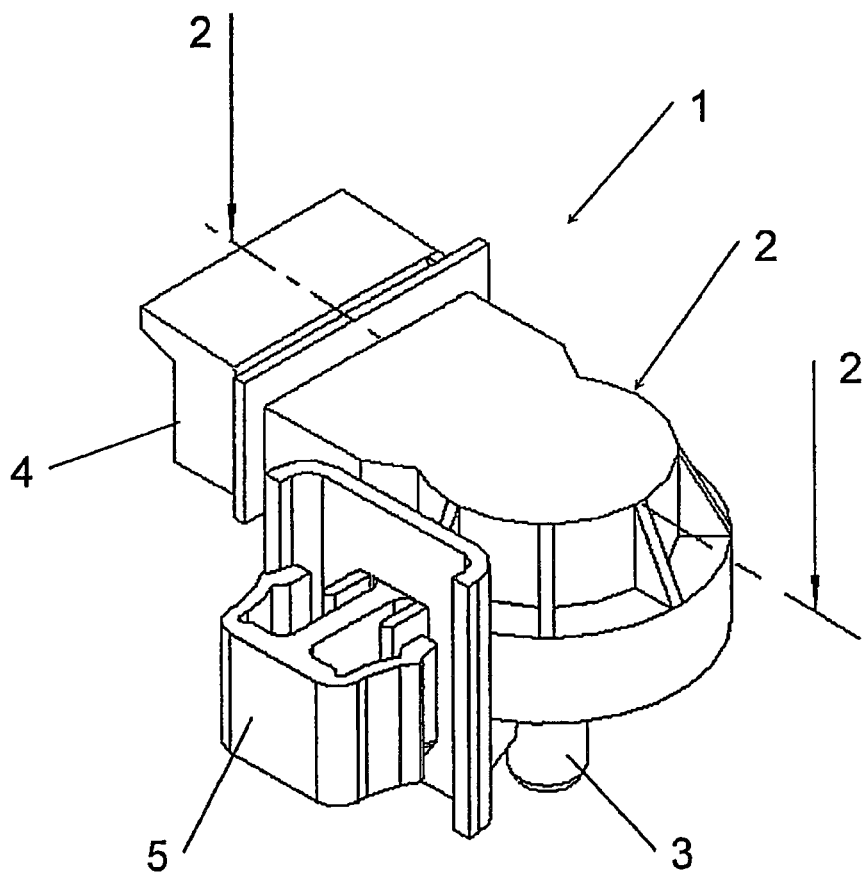
FIG. 1 shows a perspective view of a pressure sensor.

FIG. 1 shows a pressure sensor 1 which serves as a measuring apparatus for measuring a measurement variable of a fluid, specifically the pressure of a liquid in a domestic appliance in the present case. The pressure sensor 1 has a housing 2, on which a connection nozzle 3 for supplying the liquid to be measured is arranged, and also a connection plug 4 for connecting the electrical supply lines. The pressure sensor 1 can be installed in the domestic appliance by means of a latching system 5 which is located on the housing 2. The housing 2 finally comprises, according to FIG. 2, a base 6 and a cover 7.

Figure 2:
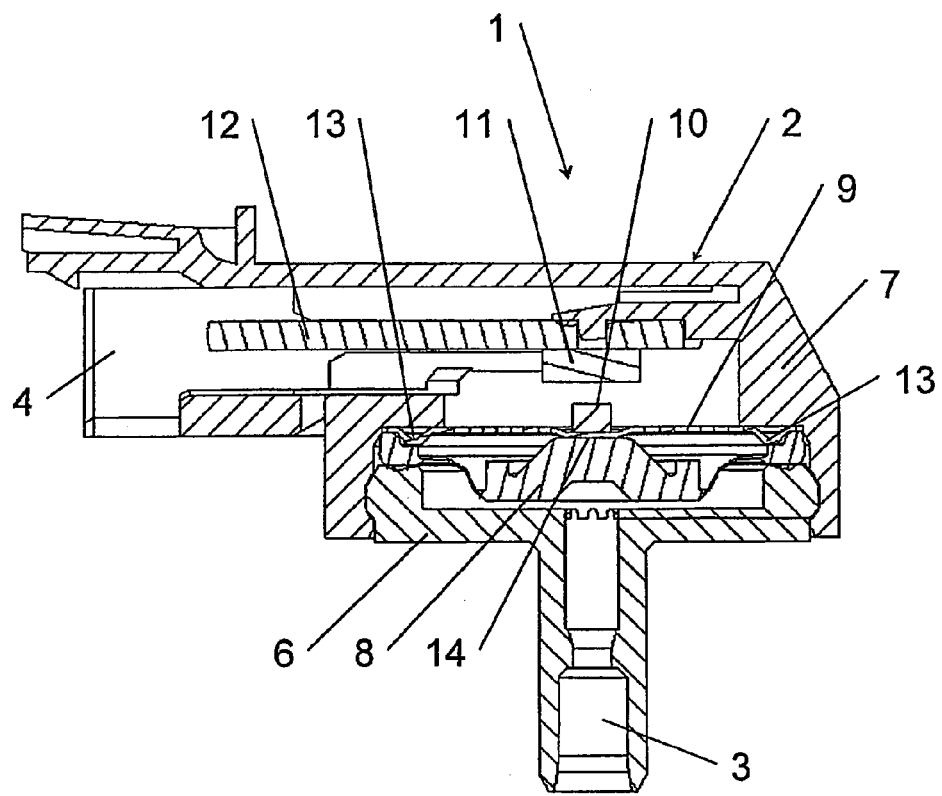
FIG. 2 shows a section through the pressure sensor along line 2-2 in FIG. 1.

As can further be gathered from FIG. 2, a diaphragm 8 is arranged in and/or on the housing 2, the liquid acting on said diaphragm by means of the connection nozzle 3. The diaphragm 8 is distorted in accordance with the pressure prevailing in the liquid. An elastic element 9 which is located in the housing 2 acts on the diaphragm 8 as a spring for restoring the diaphragm 8. A signal transmitter 10 is operatively connected to the diaphragm 8 and/or to the elastic element 9, as a result of which the signal transmitter 10 is adjusted in accordance with the distortion of the diaphragm 8. A signal receiver 11 interacts in turn with the signal transmitter 10, said signal receiver generating a signal which corresponds to the adjustment of the signal transmitter 10. The signal transmitter 10 and the signal receiver 11 are arranged in the interior of the housing 2.

Figure 4:
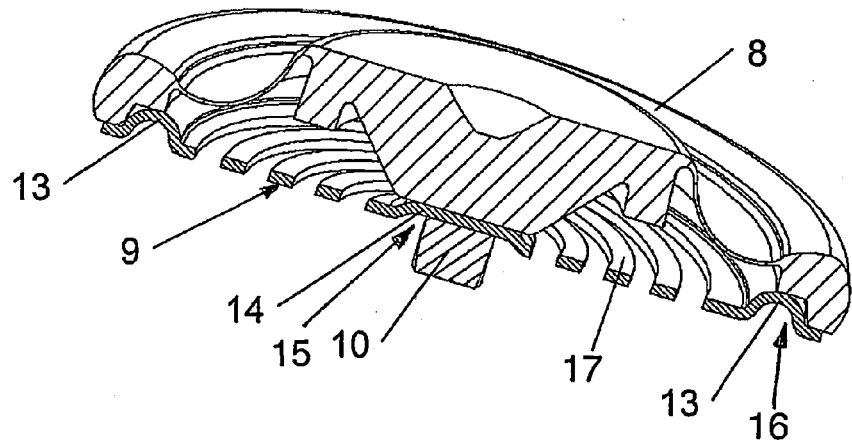
FIG. 4 shows a perspective illustration of the spring/diaphragm system from FIG. 3.

The signal transmitter 10 consists of a magnet, specifically a permanent magnet. The magnet 10 is attached to the elastic element 9, specifically adhesively bonded to the elastic element 9 in the center 15 of said elastic element (see FIG. 4). The signal receiver 11 consists of a position sensor which is arranged on a printed circuit board 12 in the housing 2 on that side of the signal transmitter 10 which is opposite the diaphragm 8. For the purpose of interaction with the magnet 10, a Hall sensor, in particular, is provided as the position sensor 11 which detects the magnetic field which is generated by the magnet 10 in accordance with the adjustment of said magnet. In the present case, the position sensor 11 is designed as an integrated circuit which contains the evaluation electronics, so that the signal which corresponds to the adjustment of the signal transmitter 10 is available in correspondingly converted form at the plug connection 4 as a measurement signal for the pressure prevailing in the liquid.

Figure 3:
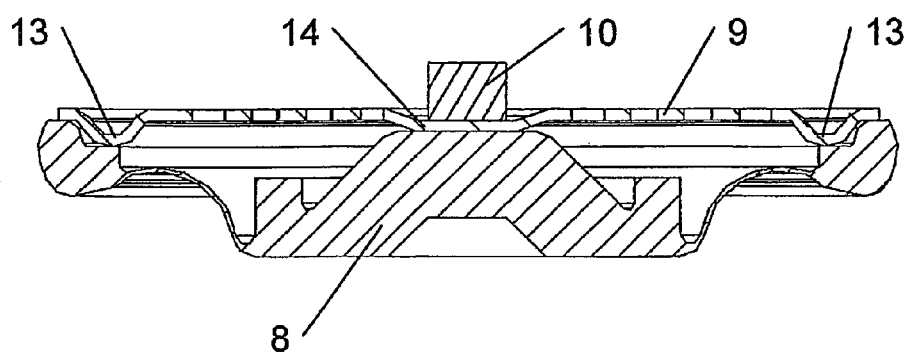
FIG. 3 shows an enlarged illustration of the spring/diaphragm system from FIG. 2.

The circular diaphragm 8 consists of an elastomer, which is composed of silicone for example. The spring 9 is composed of metal, for example a spring steel. The similarly circular spring 9 is designed in the manner of a disk-like leaf spring, as can be seen with reference to FIG. 4, and has a spring element 17 which runs from the center 15 to the edge region 16 of the leaf spring 9 in the manner of a spiral. As can further be seen in FIG. 3 or FIG. 4, a structure 13 for providing reinforcement is arranged in the edge region 16 of the elastic element 9. A further structure 14 for providing reinforcement is located in the center 15 of the elastic element 9. The structures 13, 14 are designed as a bead which has an approximately U-shaped cross section and serve to reinforce the elastic element 9. The reinforcement of the elastic element 9 in turn reduces the hysteresis for the spring 9 in respect of changes in the temperature and/or in the pressure.

The elastic element 9 can be produced as a stamped part. The structures 13, 14 are introduced into the elastic element 9 in the manner of deep-drawn impressions. The structure 14 which is located in the center 15 of the leaf spring 9 also serves as a receptacle for the magnet 10 which is fitted on the elastic element 9. For fixing purposes, the magnet 10 is adhesively bonded to the elastic element 9 in the structure 14.

Figure 5:
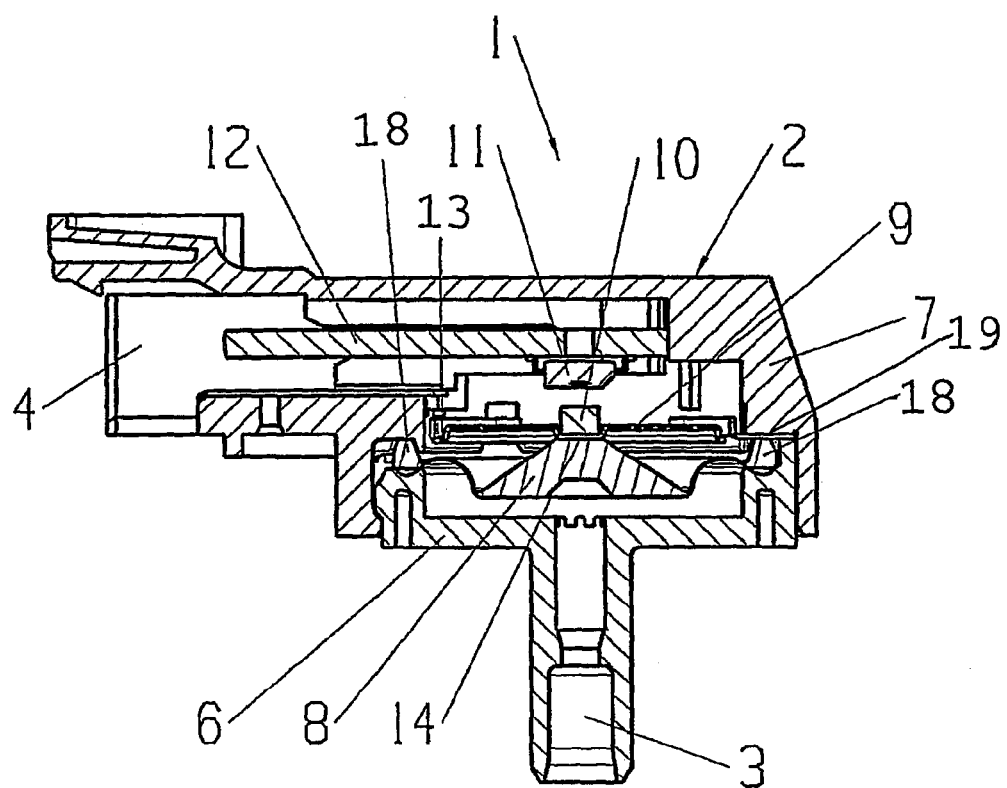
FIG. 5 shows a section, like that in FIG. 2, of a further exemplary embodiment.
Figure 6:
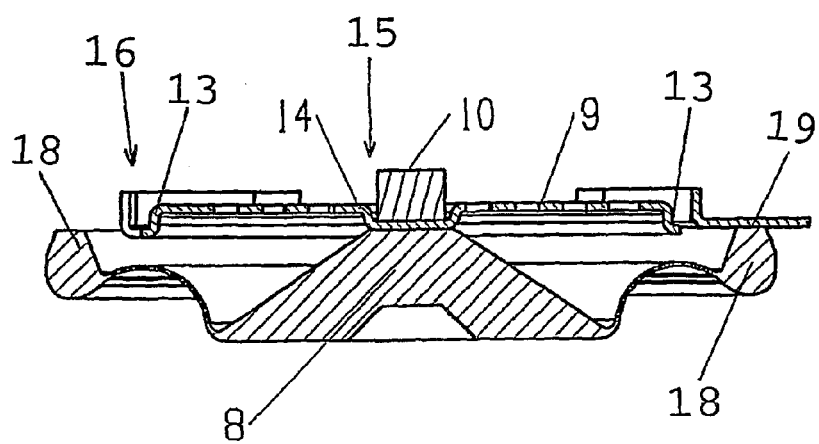
FIG. 6 shows the spring/diaphragm system according to the further exemplary embodiment in an illustration like that in FIG. 3.
Figure 7:
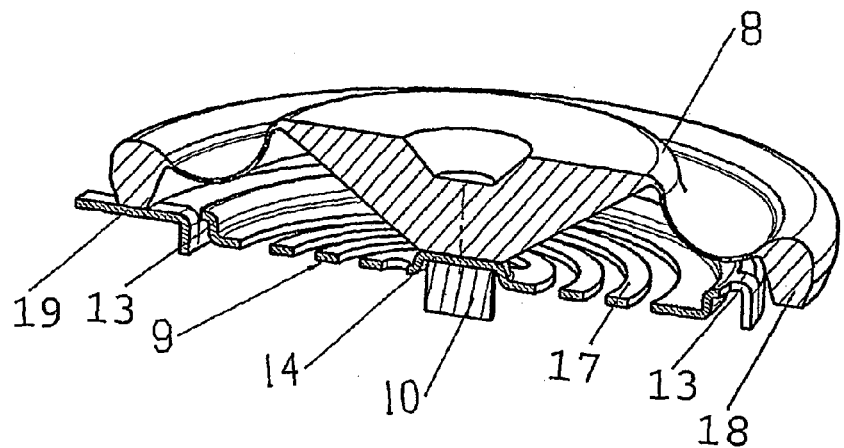
FIG. 7 shows the spring/diaphragm system according to the further exemplary embodiment in an illustration like that in FIG. 4.

FIG. 5 shows a pressure sensor 1 according to a further exemplary embodiment. In this pressure sensor 1, the leaf spring 9 has a smaller diameter than the diaphragm 8. In this case, the leaf spring 9 is thus situated substantially within the diaphragm 8, with the beading 18 which is located on the edge of the diaphragm 8 projecting beyond the leaf spring 9 in the direction of the diameter, as can be seen in FIG. 6. In accordance with FIG. 6, the leaf spring 9 once again has a bead-like structure 13 in the edge region 16 and a further bead-like structure 14 in the center 15. Furthermore, as can be seen in FIG. 7, an elongating lug 19 adjoins a point of the edge region 16 of the leaf spring 9. A point of the beading 18 rests against this lug 19. As can be seen in greater detail with reference to FIG. 5, the lug 19 serves to fasten the leaf spring 9 between the base 6 and the cover 7 of the housing 2. In addition, the leaf spring 9 can be handled in a simple manner by means of the lug 19 during installation into the housing 2.

The invention is not restricted to the described and illustrated exemplary embodiments. Rather, it also comprises all developments which are routine to a person skilled in the art within the scope of the invention defined by the patent claims. Therefore, a measuring apparatus of this kind can also be used as another sensor, such as a filling level sensor, travel sensor or the like, specifically both for domestic appliances and in other applications, for example in laboratory technology and in chemical process technology.

LIST OF REFERENCE SYMBOLS

1: Pressure sensor
2: Housing
3: Connection nozzle
4: Plug connection
5: Latching means
6: Base (of housing)
7: Cover (of housing)
8: Diaphragm
9: Elastic element/spring/leaf spring
10: Signal transmitter/magnet
11: Signal receiver/position sensor
12: Printed circuit board
13, 14: Structure (of spring)
15: Center (of elastic element)
16: Edge region (of elastic element)
17: Spiral spring element
18: Beading (of the diaphragm)
19: Lug (on the spring)

We claim:

1. A measuring apparatus for measuring a measurement variable of a fluid, comprising a housing, a diaphragm arranged in or on the housing, an elastic element for restoring the diaphragm, a signal transmitter operatively connected to at least one of the diaphragm and the elastic element, and a signal receiver that interacts with the signal transmitter, wherein the elastic element is designed as a leaf spring having a circular shape and having a reinforcement structure, and wherein the leaf spring further has a swing element that runs from the center to the edge region of the leaf spring in the manner of a spiral.

2. The measuring apparatus as claimed in claim 1, wherein the reinforcement structure is arranged in at least one of the edge region and the center of the elastic element.

3. A measuring apparatus for measuring a measurement variable of a fluid, comprising a housing, a diaphragm arranged in or on the housing, an elastic element for restoring the diaphragm, a signal transmitter operatively connected to at least one of the diaphragm and the elastic element, and a signal receiver that interacts with the signal transmitter, wherein the elastic element has a reinforcement structure designed as a bead having an approximately U-shaped cross section.

4. The measuring apparatus as claimed in claim 1, wherein the elastic element is produced as a metal stamped part in which the reinforcement structure is impressed.

5. The measuring apparatus as claimed in claim 1, wherein the signal transmitter consists of a magnet, and the signal receiver consists of a position sensor that detects the magnetic field which is generated by the magnet.

6. The measuring apparatus as claimed in claim 1, wherein the signal transmitter is arranged on the elastic element in at least part of the reinforcement structure.

7. The measuring apparatus as claimed in claim 1, wherein the diaphragm, the elastic element, the signal transmitter and the signal receiver are arranged in a interior of the housing, and the housing has a connection nozzle for supplying the fluid to the diaphragm.

8. The measuring apparatus as claimed in claim 1, wherein the measuring apparatus is a sensor.

9. The measuring apparatus as claimed in claim 5, wherein the position sensor is a Hall sensor.

10. The measuring apparatus as claimed in claim 6, wherein the signal transmitter is adhesively bonded to the center of the elastic element.

* * * * *